United States Patent
Nakagawa

(10) Patent No.: US 8,744,248 B2
(45) Date of Patent: Jun. 3, 2014

(54) MOVING PICTURE PLAYBACK DEVICE, CONTROL METHOD FOR SAME, AND STORAGE MEDIUM

(75) Inventor: Koichi Nakagawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 553 days.

(21) Appl. No.: 12/969,788

(22) Filed: Dec. 16, 2010

(65) Prior Publication Data

US 2011/0164860 A1    Jul. 7, 2011

(30) Foreign Application Priority Data

Jan. 6, 2010  (JP) .................. 2010-001567
Oct. 12, 2010  (JP) .................. 2010-230105

(51) Int. Cl.
*H04N 5/93* (2006.01)
*H04N 9/80* (2006.01)
*H04N 5/92* (2006.01)

(52) U.S. Cl.
USPC .................. 386/353; 386/248; 386/326

(58) Field of Classification Search
None
See application file for complete search history.

(56) References Cited

U.S. PATENT DOCUMENTS

2008/0152301 A1* 6/2008 Cho .................. 386/68
2012/0133791 A1* 5/2012 Tokuyama .................. 348/222.1

FOREIGN PATENT DOCUMENTS

JP    2004-221999    8/2004

* cited by examiner

*Primary Examiner* — Heather Jones
(74) *Attorney, Agent, or Firm* — Cowan, Liebowitz & Latman, P.C.

(57) ABSTRACT

When the playback speed of a moving picture is changed to a slower playback speed during playback of the moving picture, the playback at the slower playback speed starts from the top of the range which includes, out of the moving picture being played back, the frames being played back when an instruction to change the playback speed was received and in which frames having the same recording frame rate as the frames are continuously recorded. Consequently, when the playback speed is changed during the playback of a moving picture, the scene for which the user wishes to change the playback speed can be played back reliably.

14 Claims, 4 Drawing Sheets

MOVING PICTURE PLAYBACK DEVICE, CONTROL METHOD FOR SAME, AND STORAGE MEDIUM

BACKGROUND OF THE INVENTION

1. Field of the Invention

The present invention relates to technology for playing back a moving picture at a plurality of playback speeds.

2. Description of the Related Art

In the field of imaging devices such as digital cameras and digital video cameras, there is a known technique that allows images to be captured at different frame rates. With a typical moving picture, the playback frame rate during playback is the same as the recording frame rate during imaging, and the movement of the subject during playback is substantially the same as the movement of the subject during imaging (normal speed playback). In contrast, a moving picture captured at a recording frame rate higher than the recording frame rate of the typical moving picture is played back at the same playback frame rate as the playback frame rate of the typical moving picture, which results in the moving picture that is slower than normal speed playback (slow playback). Imaging at a higher recording frame rate is useful in imaging a subject with fast movements, and allows analysis of the subject's movements that cannot be perceived with the naked eye.

Japanese Patent Laid-Open No. 2004-221999 discloses a technique for changing the playback speed of a moving picture by operating an operation member during playback of a moving picture captured at a high frame rate.

However, when the user changes the playback speed by operating an operation member during playback of a moving picture as with the technique in Japanese Patent Laid-Open No. 2004-221999, there is the possibility that the scene desired by the user may not necessarily be played back. Specifically, particularly when a moving picture being played back at normal speed is changed to slow playback, there is the possibility that playback of the scene desired by the user will have already ended by the time the processing involved in changing the playback speed is completed after the user operates the operation member.

SUMMARY OF THE INVENTION

The present invention was conceived in light of these problems encountered with prior art, and provides the ability to reliably play back the scene for which the user wishes to change the playback speed when the playback speed is changed during the playback of a moving picture.

According to an aspect of the present invention, there is provided a moving picture playback device, comprising: a playback unit configured to be capable of playing back a moving picture at a first playback speed and a second playback speed that is faster than the first playback speed; a detection unit configured to detect information about a recording frame rate of each frame of a moving picture being played back by the playback unit; a receiving unit configured to receive an instruction to change the playback speed of the moving picture at the playback unit; and a control unit configured to control such that when an instruction to change the playback speed to the first playback speed is received by the receiving unit while the playback unit is playing back the moving picture at the second playback speed, the playback unit plays back the moving picture at the first playback speed from the top of a range which includes a played back frame being played back upon the receipt of the instruction and in which frames having the same recording frame rate as the played back frame are continuously recorded.

Further features of the present invention will become apparent from the following description of exemplary embodiments (with reference to the attached drawings).

DESCRIPTION OF THE EMBODIMENTS

Embodiment 1

An embodiment of the present invention will now be described in detail through reference to the drawings. The embodiment described below gives an example of applying the present invention to a digital video camera, one capable of playing back at different playback speeds a moving picture captured at a plurality of different frame rates, as an example of a moving picture playback device. However, the present invention can be applied to any device capable of playing back at different playback speeds a moving picture captured at a plurality of different frame rates. Also, the term "normal speed playback" as used in this Specification refers to a playback method in which a moving picture is played back at the recording frame rate at which the moving picture was captured, that is, is played back with the movement of the subject in the played back moving picture at substantially the same speed as the movement of the subject as captured. Specifically, when a moving picture captured at a frame rate higher than the frame rate in ordinary imaging is played back at normal speed, it ends up being played back at a playback speed that is slower than the normal playback speed. For instance, normal speed playback may be achieved by cutting out every sixth frame from a moving picture captured at a recording frame rate of 360 frames per second and playing it back at 60 frames per second. Also, the term "slow playback" refers to a playback method in which a moving picture is played back at a playback frame rate that is lower than the recording frame rate at which the moving picture was captured, that is, it is played back at a speed at which the movement of the subject in the played back moving picture is slower than the movement of the subject as captured.

Figure 1:
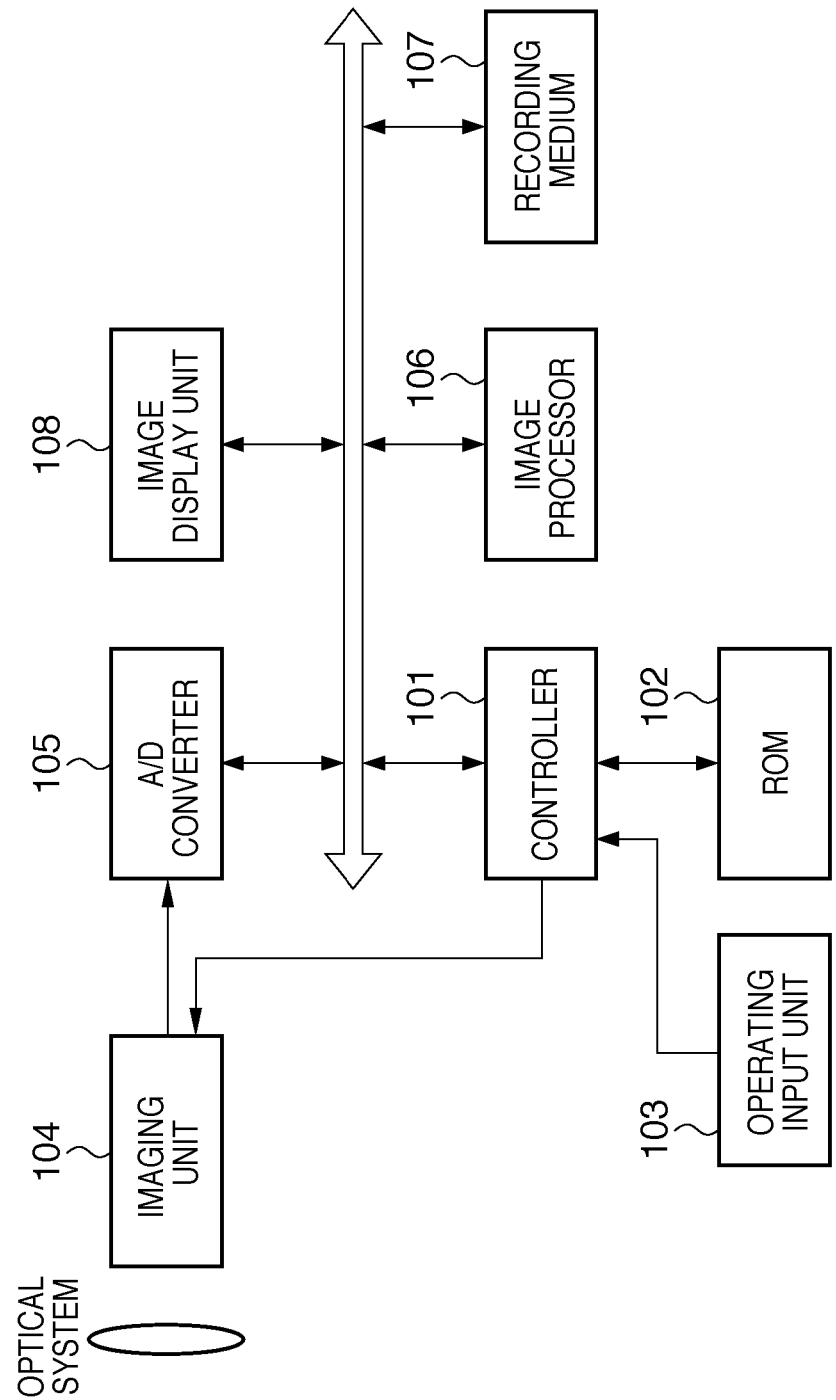
FIG. 1 is a block diagram of the functional configuration of a digital video camera according to an embodiment of the present invention.

FIG. 1 is a block diagram of the functional configuration of a digital video camera 100 according to an embodiment of the present invention.

A controller 101 is a block that controls the operation of the various blocks comprised by a digital video camera 100. The controller 101 reads the operating programs for the various blocks of the digital video camera 100 stored in a ROM 102, for example, expands these into a RAM (not shown), and executes them, thereby controlling the operations of the blocks. The ROM 102 is a rewritable nonvolatile memory, and in addition to the operating programs of the various blocks of the digital video camera 100, it stores settings such as parameters required for the operation of the blocks, data such as a GUI displayed on an image display unit 108, and so forth.

An operating input unit 103 is, for example, a record button, a menu button, or another such input interface comprised by the digital video camera 100, and the user operates it to send the details of the inputted operation to the controller 101. With the digital video camera 100 of this embodiment, the image display unit 108 (discussed below) is equipped with a touch sensor, which is capable of detecting touch input from the user. An operating input unit 103 also detects the touch input from the user detected by the touch sensor, and the details of the touch input are sent to the controller 101.

An imaging unit 104 is, for example, a CCD, a CMOS sensor, or another such imaging element, which subjects an object image formed by the optical system on the imaging element to photoelectric conversion, and sends the analog image signal thus obtained to an A/D converter 105. The A/D converter 105 subjects the inputted analog image signal to A/D conversion processing, and sends the digital image thus obtained to an image processor 106. If the digital video camera 100 is in recording mode, for example, the A/D converter 105 successively outputs the obtained digital image to the image display unit 108, and the image display unit 108 can be made to function as an electronic viewfinder.

The image processor 106 subjects the inputted digital image to various kinds of image processing, or to enlargement or reduction processing. When recording processing is performed, the image processor 106 sequentially stores the digital images that have undergone various processing in a RAM, for example, and the moving picture data of the resulting image group is encoded into moving picture data with an AVCHD format along with information about the frame rate during imaging. Also, the image processor 106 reads the encoded moving picture data recorded to a recording medium 107 (discussed below), decodes the data, and outputs it to the image display unit 108. The image processor 106 also combines the moving picture data with GUI data stored in the ROM 102 and outputs this product to the image display unit 108.

The recording medium 107 is a recording region in which moving picture data is recorded, and is, for example, a memory built into the digital video camera 100, or a memory card, hard disk drive, or other such recording device connected removably to the digital video camera 100. The image display unit 108 is, for example, a display device provided to the digital video camera 100, such as a compact LCD, and is used in the playback of captured images and of moving picture data recorded to the recording medium 107. Also, in this embodiment the image display unit 108 is described as having a touch sensor, but the present invention is not limited to this constitution.

To simplify the description in this embodiment, the digital video camera 100 shall be assumed to be capable of imaging at two different frame rates: 60 frames per second (60 FPS) and 360 FPS. Specifically, the user selects the imaging mode of the digital video camera 100 from among a normal mode (60 FPS) and a high frame rate imaging mode (360 FPS) with a higher frame rate than normal. In the following description, a moving picture captured in normal mode shall be termed a basic frame rate moving picture, and a moving picture captured in high frame rate imaging mode shall be termed a high frame rate moving picture. The playback modes of the digital video camera 100 are normal speed playback mode and slow playback mode.

Playback Speed Change Processing

Figure 2:
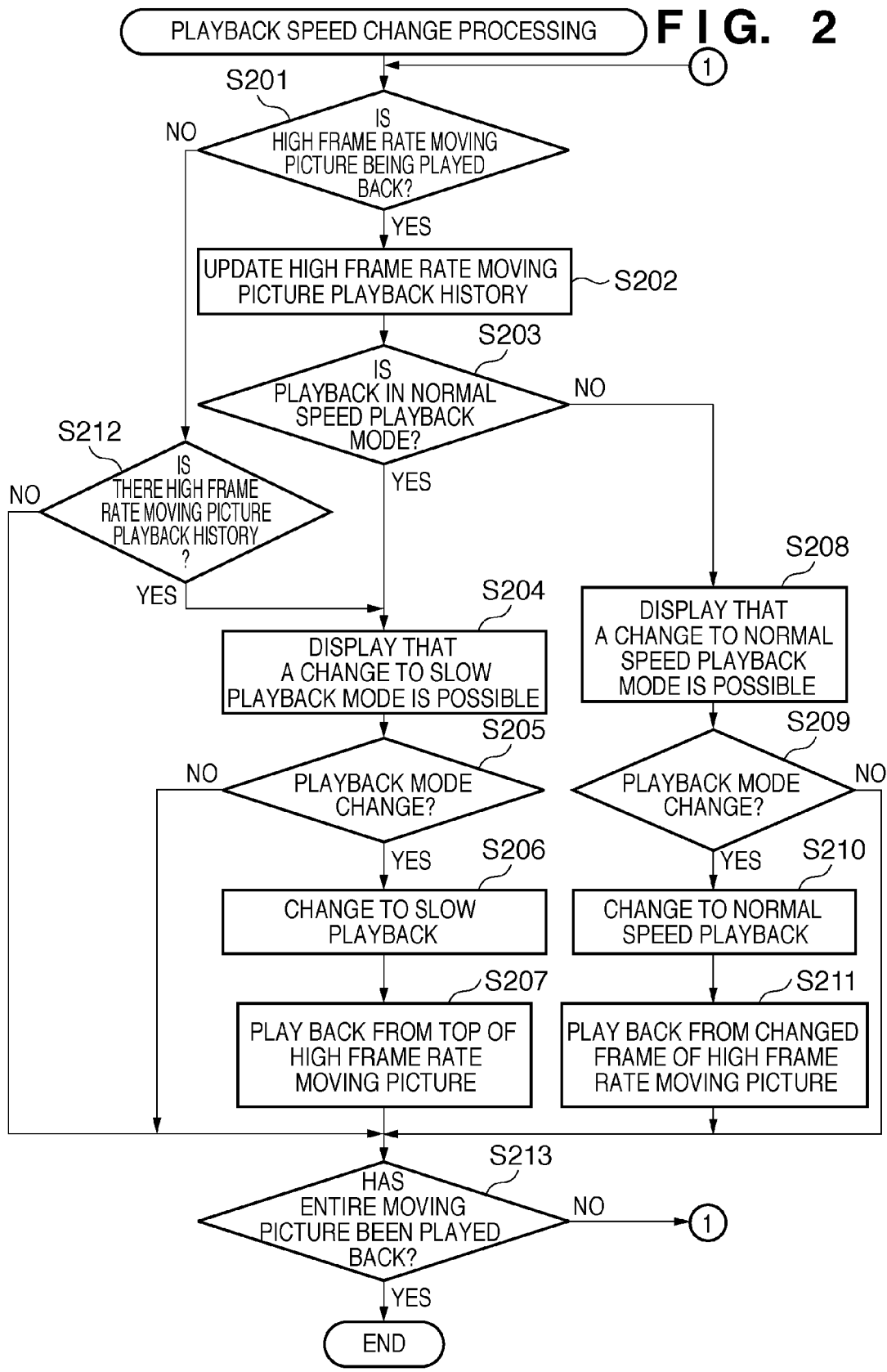
FIG. 2 is a flowchart of the playback speed change processing in Embodiment 1.

The processing to change the playback speed of the digital video camera 100 in this embodiment, constituted as above, will be described through reference to FIG. 2.

This playback speed change processing is executed at the start of playback of a moving picture recorded to the recording medium 107, with the playback continuing from the moving picture file at which playback started, in order, up to the most recently recorded moving picture file. The user selects, by touch input on the screen, the moving picture file at which to start playback from a GUI on which are arrayed the representative images of the moving picture (as in FIG. 4E) displayed on the image display unit 108, for example. In this embodiment, with a moving picture displayed on the GUI, an icon expressing that the moving picture was captured at 360 FPS is displayed over the representative images, as in FIG. 4E, for a high frame rate moving picture.

In step S201, the controller 101 determines whether the moving picture currently being played back is a high frame rate moving picture. If the controller 101 determines that the moving picture currently being played back is a high frame rate moving picture, the processing moves to S202, but if the moving picture currently being played back is a basic frame rate moving picture, the processing moves to S212.

In S202, the controller 101 updates the information about high frame rate moving picture playback history, which expresses the last high frame rate moving picture to be played back, stored in the ROM 102, for example, to the high frame rate moving picture currently being played back. Then, in S203, the controller 101 determines whether the current playback mode is the normal speed playback mode. Information about the current playback mode may be stored in the ROM 102, for example, and is updated by the user with the operating input unit 103 whenever the playback mode is changed. The controller 101 moves the processing to S204 when the current playback mode is the normal speed playback mode, and moves the processing to S208 when the current playback mode is the slow playback mode.

Figure 4A:
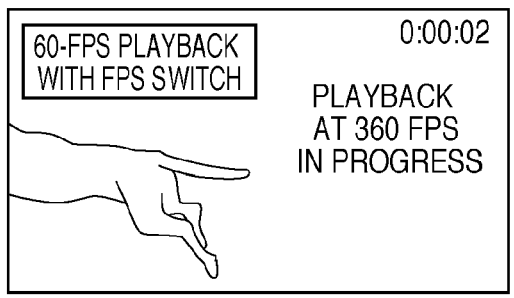
FIGS. 4A, 4B, 4C, 4D, 4E and 4F are diagrams illustrating GUI display examples according to an embodiment.

In S204 the controller 101 outputs to the image processor 106 the GUI data stored in the ROM 102, for example, that is used for notifying the user that a change to slow playback mode is possible, and combines it in the image processor 106 with the moving picture currently being played back. The controller 101 then displays on the image display unit 108 a moving picture that includes a notification that change is possible, as combined in the image processor 106. As shown in FIG. 4A, for example, this notification that change is possible tells the user that a high frame rate moving picture captured at 360 FPS can be seen in slow playback at 60 FPS, as displayed in the upper-left part of the displayed area, by pressing an FPS switch provided to the operating input unit 103. The playback time, information about the frame rate being played back (playback speed), or the like may also be displayed in the upper-right part of the display area.

In S205 the controller 101 causes the operating input unit 103 to determine whether the user has operated the FPS switch provided to the operating input unit 103, and whether a playback mode change has been received. The controller 101 moves the processing to S206 if the playback mode has been changed to the slow playback mode, and moves the processing to S213 if the playback mode has not been changed from the normal speed playback mode.

Figure 4B:
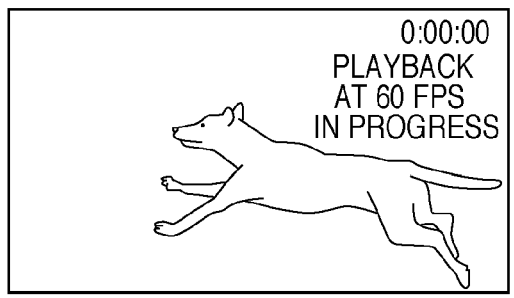

In S206 the controller 101 changes the information about the playback mode stored in the ROM 102 to the slow playback mode. Then, in S207 the controller 101 plays back the high frame rate moving picture currently being played back, at 60 FPS, which is lower than the frame rate when the image was captured, from the top frame of the moving picture, and this is displayed on the image display unit 108 as shown in FIG. 4B.

In S203, if the high frame rate moving picture currently being played back is played back in slow playback mode, the following happens. In S204, the controller 101 outputs to the image processor 106 the GUI data that is stored in the ROM 102 and that is used for notifying the user that a change to normal speed playback mode is possible, and combines it in the image processor 106 with the moving picture currently being played back. The controller 101 then displays on the image display unit 108 a moving picture that includes a notification that change is possible.

In S209 the controller 101 causes the operating input unit 103 to determine whether the user has operated the FPS switch provided to the operating input unit 103, and whether the playback mode has been changed. The controller 101 moves the processing to S210 if the playback mode has been changed to the normal speed playback mode, and moves the processing to S213 if the playback mode has not been changed from the slow playback mode.

Figure 4C:
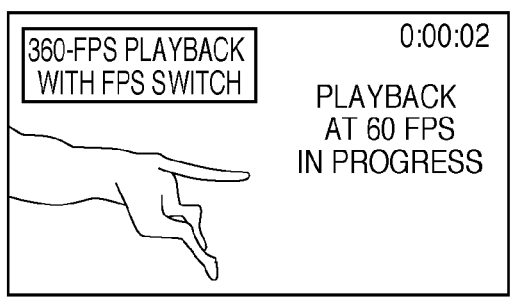

In S210 the controller 101 changes the information about the playback mode stored in the ROM 102 to normal speed playback mode. Then, in S211 the controller 101 plays back the high frame rate moving picture currently being played back, at 360 FPS, which is the same as the frame rate when captured, from the next frame after the frame currently being played back, and displays this on the image display unit 108 as shown in FIG. 4C.

Also, if it is determined in S201 that the moving picture currently being played back is not a high frame rate moving picture, then in S212 the controller 101 determines whether the information about high frame rate moving picture playback history stored in the ROM 102 includes information about a high frame rate moving picture. More specifically, it is determined whether a high frame rate moving picture is present in the moving picture played back prior to the basic frame rate moving picture currently being played back. The information about high frame rate moving picture playback history shall be reset every time this playback speed change processing is executed.

Figure 4D:
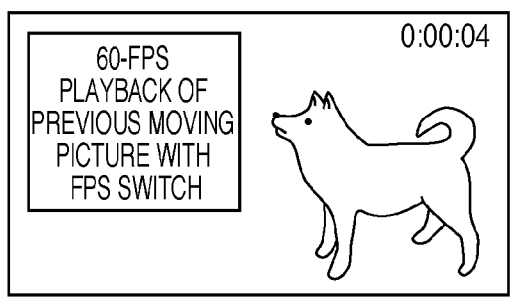
Figure 4E:
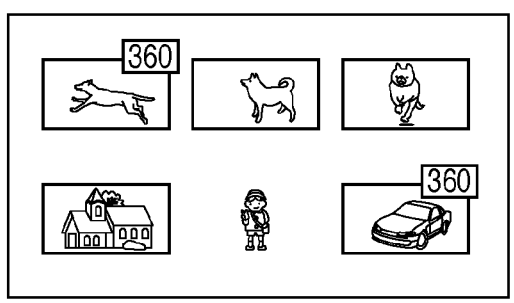

The controller 101 moves the processing to S204 if a high frame rate moving picture has been played back prior to the moving picture currently being played back, and moves the processing to S213 if there is no high frame rate moving picture playback history. Furthermore, if the processing moves from S212 to S204, the controller 101 shall process as follows in steps S204 to S207. In S204, as shown in FIG. 4D, the controller 101 causes the image processor 106 to combine a notification of the possibility of a change to slow playback of a moving picture in playback history with the basic frame rate moving picture, and displays this on the image display unit 108. Also, in S207 the controller 101 plays back the last high frame rate moving picture to be played back, at 60 FPS from the top frame, out of the high frame rate moving picture played back prior to the basic frame rate moving picture currently being played back, and displays this on the image display unit 108.

In S213, the controller 101 determines whether the entire moving picture stored on the recording medium 107 and to be played back has been played back, and if the entire moving picture has been completely played back, playback speed change processing is completed. If the entire moving picture has not been completely played back, the controller 101 returns the processing to S201, and playback speed change processing is continued.

In this embodiment, the basic frame rate moving picture and the high frame rate moving picture were described as being separate moving picture files, but the present invention can be worked in other ways. Specifically, moving picture parts recorded at the basic frame rate and the high frame rate may both be present in a single moving picture file. In this case, in playback speed change processing, when a moving picture part recorded at a high frame rate is changed to slow playback during playback, the slow playback is performed not from the top of the moving picture, but from the top of the moving picture part recorded at the high frame rate.

As described above, with the moving picture playback device of this embodiment, when a moving picture that is being played back is changed from its current playback speed to a slower playback speed, playback at the slower playback speed starts from the top of the range of the same frame rate. More specifically, the moving picture playback device is able to play back a moving picture recorded at different frame rates by changing the playback speed. When the playback speed of a moving picture is changed to a slower playback speed while the moving picture is being played back, the following happens. Playback at the slower playback speed starts from the top of the range that includes frames played back when an instruction to change the playback speed was received, out of the moving picture being played back, and in which frames having the same recording frame rate as these frames have been continuously recorded. Consequently, when the user changes the playback speed, the details of the moving picture at the time of that operation can be reliably conveyed to the user at a slower playback speed.

Also, with this moving picture playback device, if playback at a slower playback speed is made possible only for a moving picture recorded at a higher frame rate than the playback frame rate used as a reference, then the moving picture can be played back at the slower playback speed as in the following case while the moving picture recorded at the frame rate serving as a reference is being played back. More specifically, when a moving picture recorded at a high frame rate is played back prior to the playback of a moving picture recorded at the reference frame rate, then the moving picture recorded at the high frame rate is played back at a slower playback speed. Here, the moving picture played back last out of the played back moving picture recorded at the high frame rate is played back at the slower playback speed. Consequently, when the user changes the playback speed, then even if there is a change in the frame rate of the moving picture, the details of the moving picture at the time of that operation can be reliably conveyed to the user at a slower playback speed.

Embodiment 2

Another embodiment of the present invention will now be described in detail through reference to the drawings.

In Embodiment 1, the user was notified that the playback speed could be changed, by providing a text message on the GUI. Also, when a basic frame rate moving picture was being played back, if there was playback history for a high frame rate moving picture prior to the basic frame rate moving picture being played back, the high frame rate moving picture was changed to the display of a slow playback. With the digital video camera in Embodiment 2, a GUI is displayed that shows the details of the moving picture displayed by changing the playback speed. When there is playback history for a high frame rate moving picture, the time is set so as to allow the display to be changed to the slow playback of the moving picture with playback history.

The functional configuration of the digital video camera 100 in this embodiment is the same as that in Embodiment 1, and will not be described again.

Playback Speed Change Processing

Figure 3:
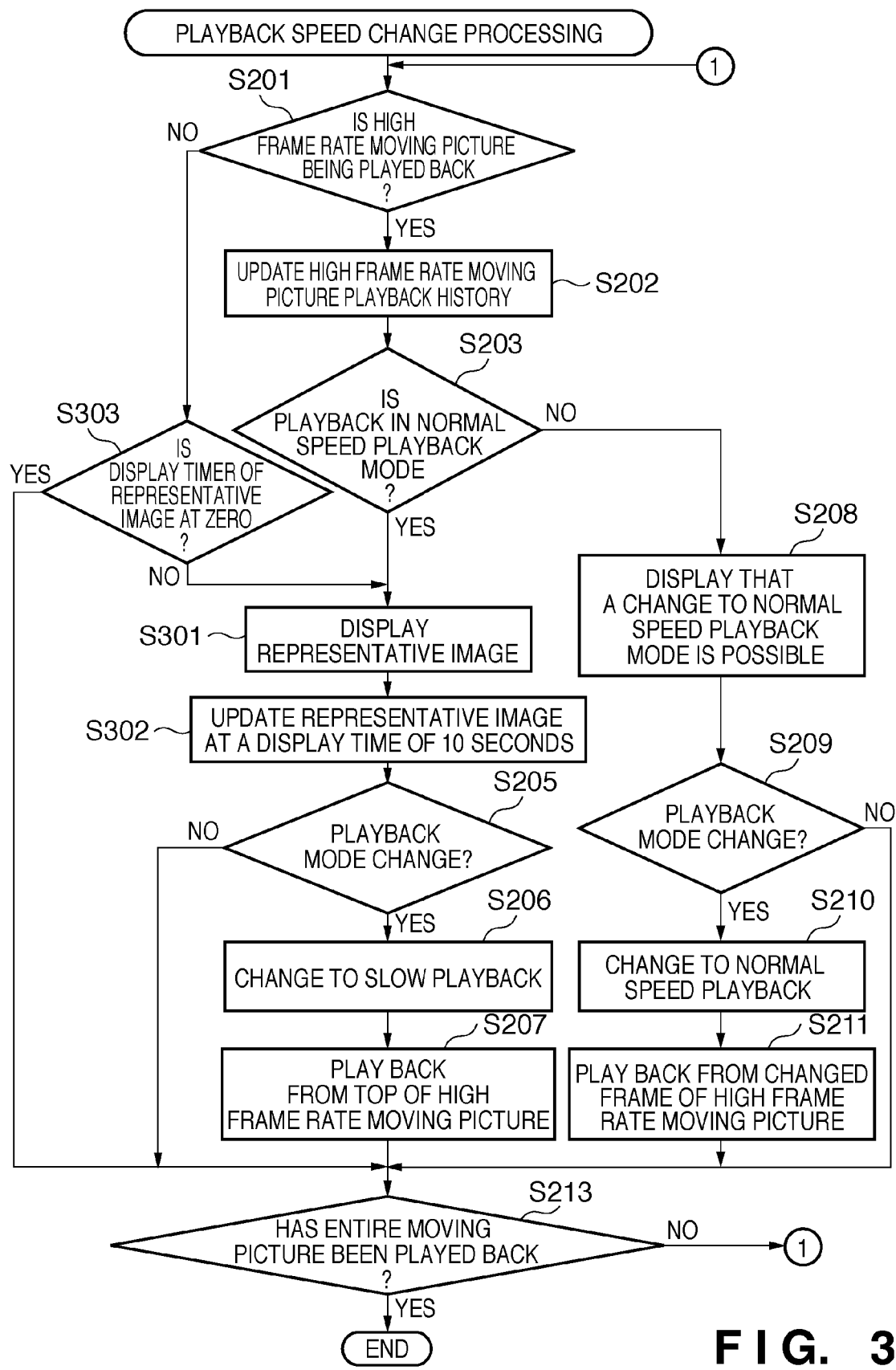
FIG. 3 is a flowchart of the playback speed change processing in Embodiment 2.

The playback speed change processing of the digital video camera 100 in this embodiment will be described through reference to FIG. 3. In this playback speed change processing, the steps in which the same processing as in the playback speed change processing of Embodiment 1 are numbered the same and will not be described again, and we will focus on describing the steps that are characteristic of this embodiment. Furthermore, this playback speed change processing is also processing executed at the start of playback of a moving picture recorded on the recording medium 107, with the playback continuing from the moving picture file at which playback started, in order, up to the most recently recorded moving picture file.

In S201 the controller 101 determines whether the moving picture currently being played back is a high frame rate moving picture. If the controller 101 determines that the moving picture currently being played back is a high frame rate moving picture, the processing moves to S202, but if it is a basic frame rate moving picture, the processing moves to S303.

In S203, the controller 101 determines whether the current playback mode is the normal speed playback mode, and if it is the normal speed playback mode, the processing moves to S301. If the current playback mode is the slow playback mode, the controller 101 moves the processing to S208.

Figure 4F:
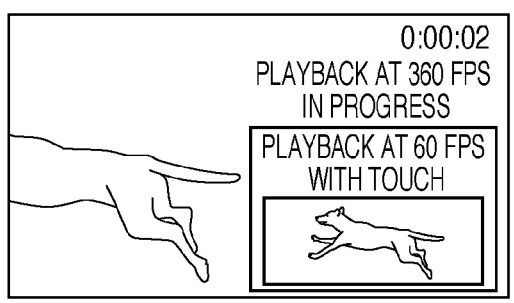

In S301 the controller 101 reads information stored in the recording medium 107, about a representative image of the moving picture currently being played back, outputs this information to the image processor 106, and combines the moving picture currently being played back with reduced a representative image at the image processor 106 as a change possibility notification. The information about a representative image may be a typical image showing the details of the moving picture, or an image of a frame within the moving picture, such as an image of the top frame of the moving picture, and this information is stored in the recording medium 107. The controller 101 then displays on the image display unit 108 a moving picture including the change possibility notification combined at the image processor 106. As shown in FIG. 4F, for example, a change possibility notification may involve the display of a representative image of the moving picture currently being played back, in the lower-right part of the display region, and may be a region where touch input is possible as in this embodiment. In S302 the controller 101 updates information about the display time of the representative image stored in a RAM, for example. This information about the display time of the representative image is a specific length of time associated with information specifying a high frame rate moving picture that can be changed, and is set at 10 seconds in this embodiment. Also, the information about the display time of the representative image of the high frame rate moving picture currently being played back is updated every 10 seconds as long as the high frame rate moving picture currently being played back is still being played back. The controller 101 controls so that a display timer for managing the display time is reduced upon completion of the playback of the high frame rate moving picture currently being played back. Specifically, the information about the display time of the representative image expresses how long it is possible to receive an instruction to change the playback speed of the displayed moving picture after the moving picture has changed.

In S205 the controller 101 causes the operating input unit 103 to determine whether there has been an instruction to change the playback mode by touch input from the user to the GUI of the representative image which is displayed as a change notification on the image display unit 108, for example. The controller 101 moves the processing to S206 if the playback mode has been changed to the slow playback mode, and moves the processing to S213 if the playback mode has not been changed from the normal speed playback mode.

If it is determined in S201 that the moving picture currently being played back is a basic frame rate moving picture, then in S303 the controller 101 determines whether the display timer for the representative image, which is associated with information about a moving picture with a high frame rate moving picture playback history, is at zero. If the display timer for the representative image is at zero, the controller 101 moves the processing to S214, and if the display timer for the representative image is not at zero, it moves the processing to S301. The controller 101 may leave open any information about a high frame rate moving picture playback history for which the display timer has reached zero.

In this playback speed change processing, if there is continuous playback of different high frame rate moving pictures, then for example, a representative image of the high frame rate moving picture played back immediately prior and a representative image of the high frame rate moving picture being played back may be displayed side by side. Specifically, the user can look at the representative images and decide which moving picture to watch in slow playback up until the display timer of the representative image of the high frame rate moving picture that was played back immediately prior reaches zero.

The number of representative images displayed at the same time may also be settable. Specifically, if the number of representative images displayed at the same time is two, then when a high frame rate moving picture is played back three times in a row, the display of the first moving picture representative image shall be forcibly ended if the playback time of the second moving picture is shorter than the display time of the first moving picture representative image.

In this embodiment, a method involving the display of a moving picture representative image with which the playback speed could be changed for playback was described as an example of change possibility notification, but the present invention can be worked in other ways. For instance, rather than using a representative image, a moving picture with which changing the playback speed is actually possible and that has been played back slowly may be displayed as a change possibility notification.

Further, in this embodiment the description was of the basic frame rate moving picture and the high frame rate moving picture being separate moving picture files, but the present invention can be worked in other ways. Specifically, moving picture parts recorded at the basic frame rate and the high frame rate may both be present in a single moving picture file. In this case, in playback speed change processing, when a moving picture part recorded at a high frame rate is changed to slow playback during playback, the slow playback is performed not from the top of the moving picture, but from the top of the moving picture part recorded at the high frame rate.

As described above, with the moving picture playback device of this embodiment, when a moving picture that is being played back is changed from its current playback speed to a slower playback speed, playback at the slower playback speed starts from the top of the range of the same frame rate. More specifically, the moving picture playback device is able to play back a moving picture recorded at different frame rates by changing the playback speed. When the playback speed of a moving picture is changed to a slower playback speed while the moving picture is being played back, the following happens. Playback at the slower playback speed starts from the top of the range that includes frames played back when an instruction to change the playback speed was received, out of the moving picture being played back, and in which frames having the same recording frame rate as these frames have been continuously recorded. Consequently, when the user changes the playback speed, the details of the moving picture at the time of that operation can be reliably conveyed to the user at a slower playback speed.

Also, with this moving picture playback device, if playback at a slower playback speed is made possible only for a moving picture recorded at a higher frame rate than the playback frame rate used as a reference, then the moving picture can be played back at the slower playback speed as in the following case. More specifically, when a moving picture recorded at a high frame rate is played back, and then the next moving picture is played back within a specific length of time, it is possible for the immediately prior moving picture recorded at a high frame rate to be played back at a slower playback speed. Consequently, when the user performs an operation to change the playback speed, even if there is a change in the frame rate of the moving picture, the details of the moving picture at the time of that operation can be reliably conveyed to the user at a slower playback speed.

In Embodiments 1 and 2 above, a case is described in which, when the normal speed playback mode is changed to the slow playback mode, slow playback is started by returning from the frame that was being played back, to the top frame of the high frame rate moving picture being played back. Here, changing the playback mode interrupts the time continuity in the frames of the moving picture being played back. Also, particularly when moving picture parts recorded at a basic frame rate and a high frame rate are both present in a single moving picture file as discussed above, since processing is performed to find and play back the playback start frame after the change, it is conceivable that this will take time at the start of moving picture playback. When such a change is made, a guide indication may be provided so as not to confuse the viewer with interruption of the moving picture playback or the playback of non-continuous frames. For example, the display may be "Return to top portion of current moving picture (or current scene) and perform slow playback," or may be "Processing in progress."

Also, it was described above that when the normal speed playback mode is changed to the slow playback mode, slow playback starts from the top of the high frame rate moving picture being played back (the high frame rate portion) regardless of the elapsed time from the top of this high frame rate moving picture until the frame being played back. However, the present invention can be worked in other ways, and when the frame being played back upon receipt of an instruction to change to slow playback mode is at least a specific length of time or at least a specific number of frames away from the top of the high frame rate moving picture, the following decision is made. Specifically, it is conceivable that an instruction to change to slow playback mode after a specific length of time has elapsed since the top of the high frame rate moving picture is not intended to start slow playback from the top of the moving picture, but rather to start slow playback from the frame being played back or a frame that is near the frame. Accordingly, slow playback may be performed by going back to the frame a set length of time earlier, predetermined as a delayed reaction component, in order to compensate for the delayed reaction component needed from the point when the viewer decides to change the playback mode at the frame being played back until the viewer actually performs an operation according to an instruction to change the playback mode. Alternatively, the change to the slow playback mode may be made at the frame being played back upon receipt of the change instruction, with the frame continuity left intact.

Also, when attribute information indicating how a moving picture is partitioned up is associated with a frame within the moving picture by a so-called chapter insertion function or the like, the frame at which playback is started upon a change from normal speed playback mode to slow playback mode may be as follows. For example, when a frame to which a chapter has been set is present at some point between the playback frame upon a change to slow playback mode and the top frame of the high frame rate moving picture being played back, the slow playback may be started from the frame to which a chapter has been set. Furthermore, if a plurality of frames to which a chapter has been set are present at some point between the frame being played back upon receipt of an instruction to change the playback mode and the top frame, playback may be started from the frame closest to the frame being played back out of the plurality of frames. Doing this makes it possible to start slow playback from the top frame of the chapter that includes the frame being played back upon the change to the slow playback mode.

Specifically, the moving picture playback device according to the present invention is such that when an instruction to change the normal speed playback mode to the slow playback mode is received, control is performed so that, within a range that includes the frame being played back and in which frames having the same recording frame rate as the frame being played back are continuously recorded, slow playback is started from the frame closest to the frame being played back, that is, the frame played back subsequently in time series, out of:

(1) the top frame of the range, and (2) the frame closest to the frame being played back, to which is associated attribute information indicating the partitioning of the moving picture.

The above-mentioned attribute information indicating the partitioning of the moving picture is not limited to information that defines the playback start frame in a moving picture (such as a chapter), and may be any specific attribute information indicating that there has been a change in the conditions during playback or recording between continuous frames. Examples of specific attribute information indicating that there has been a change in the conditions between continuous frames include the following.

(1) Information indicating a frame in which appears a face that is the result of facial detection.

(2) Information indicating a frame in which appears the face of a specific, registered person.

(3) Information indicating a frame to which has been imparted information such as "favorite," "representative image," or the like.

(4) Information indicating a frame in which a scene designated during imaging has changed.

(5) Information indicating a frame in which an imaging setting made during imaging has changed.

Also, in Embodiments 1 and 2 above, the description was of an example of changing from normal speed playback mode to slow playback mode, but other options exist, and the present invention can be applied so long as the playback speed is changed from a second playback speed to a slower first playback speed. For instance, the present invention may be applied when the playback speed is further reduced in a case in which all the frames of a high frame rate moving picture recorded at 360 FPS are played back at a playback speed of 60 FPS (it takes six seconds to play back 360 frames, which is slower than real time during imaging).

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-001567 filed Jan. 6, 2010, and No. 2010-230105 filed Oct. 12, 2010 which are hereby incorporated by reference herein in their entirety.

What is claimed is:

1. A moving picture playback device, comprising:
a playback unit configured to be capable of playing back a moving picture at a first playback speed and a second playback speed that is faster than the first playback speed;
a detection unit configured to detect information about a recording frame rate of each frame of a moving picture being played back by the playback unit;
a receiving unit configured to receive an instruction to change the playback speed of the moving picture at the playback unit; and
a control unit configured to control such that when an instruction to change the playback speed to the first playback speed is received by the receiving unit while the playback unit is playing back the moving picture at the second playback speed, the playback unit goes back from a played back frame being played back upon the receipt of the instruction and plays back the moving picture at the first playback speed from a first frame of a plurality of frames continuously recorded at the same recording frame rate as the played back frame, wherein the plurality of frames include the played back frame.

2. The moving picture playback device according to claim 1, wherein the control unit controls such that if the played back frame is a frame for which the elapsed playback time since the first frame of the plurality of frames is at least a specific time, or a frame that is at least a specific number of frames away from the first frame of the plurality of frames, then the first frame of the plurality of frames is not used as the frame started playback at the first playback speed.

3. The moving picture playback device according to claim 1, wherein the control unit controls such that if there is a frame to which specific attribute information has been associated between the played back frame and the first frame of the plurality of frames, then playback unit plays back the moving picture at the first playback speed from the frame, to which specific attribute information has been associated, closest to the played back frame.

4. The moving picture playback device according to claim 1, wherein the playback unit is capable of playing back a moving picture recorded at a first recording frame rate and/or a second recording frame rate that is higher than the first recording frame rate, and
the control unit controls such that if the recording frame rate of the played back frame is the second recording frame rate when an instruction to change from the second playback speed to the first playback speed is received by the receiving unit, then the playback unit plays the moving picture at the first playback speed from the first frame of the plurality of frames continuously recorded at the second recording frame rate, wherein the plurality of frames include the played back frame.

5. The moving picture playback device according to claim 4, wherein the control unit controls such that if the recording frame rate of the played back frame is the first recording frame rate when an instruction to change from the second playback speed to the first playback speed was received by the receiving unit, then the playback unit plays back at the first playback speed from the first frame of the plurality of frames which were played back last and in which frames played back prior to the played back frame and having the second recording frame rate are the continuously recorded.

6. The moving picture playback device according to claim 5, wherein the receiving unit receives an instruction to change from the second playback speed to the first playback speed and play back the plurality of frames having the second recording frame rate and continuously recorded by the playback unit for a specific length of time after the end of playback at the second playback speed of the plurality of frames having the second recording frame rate and continuously recorded.

7. The moving picture playback device according to claim 1, comprising a display control unit configured to control such that an indication that changing between the first playback speed and the second playback speed is possible is displayed on a display unit along with the moving picture.

8. The moving picture playback device according to claim 7, wherein the display control unit controls such that a guide indication that a change is in progress is displayed when the playback speed of the moving picture by the playback unit is changed from the second playback speed to the first playback speed.

9. The moving picture playback device according to claim 7, wherein the display control unit controls such that a representative image of the plurality of frames of the moving picture to be played back after the change of the playback speed is displayed along with the moving picture.

10. The moving picture playback device according to claim 7, wherein the display control unit controls such that the plurality of frames of the moving picture to be played back after the change of the playback speed is displayed by being played back at the first playback speed along with the moving picture being played back at the second playback speed.

11. The moving picture playback device according to claim 1, wherein the playback unit goes back from the played back frame upon receipt of the instruction and plays back the moving picture at the first playback speed from the first frame of the plurality of frames regardless of elapsed time from the first frame of the plurality of frames until the played back frame.

12. A method for controlling a moving picture playback device including a playback unit configured to be capable of playing back a moving picture at a first playback speed and at a second playback speed that is faster than the first playback speed, the method comprising the steps of:
  detecting information about a recording frame rate of each frame of a moving picture being played back by the playback unit;
  receiving an instruction to change the playback speed of the moving picture at the playback unit; and
  controlling such that when an instruction to change the playback speed to the first playback speed is received in the receiving step while the playback unit is playing back the moving picture at the second playback speed, the playback unit goes back from a played back frame being played back upon receipt of the instruction and plays back the moving picture at the first playback speed from a first frame of a plurality of frames continuously recorded at the same recording frame rate as the played back frame, wherein the plurality of frames include.

13. The method for controlling the moving picture playback device according to claim 12, wherein the playback unit goes back from a played back frame upon receipt of the instruction and plays back the moving picture at the first playback speed from the first frame of the plurality of frames regardless of elapsed time from the first frame of the plurality of frames until the played back frame.

14. A non-transitory computer readable storage medium that stores a program that causes a computer to function as various units of the moving picture playback device according to claim 1.

* * * * *